United States Patent
Wong et al.

(10) Patent No.: US 8,228,091 B2
(45) Date of Patent: Jul. 24, 2012

(54) FALSE-LINK PROTECTION CIRCUIT AND METHOD FOR UTILIZING SAME

(75) Inventors: Ark-Chew Wong, Irvine, CA (US); Joseph Aziz, Irvine, CA (US); Derek Tam, Irvine, CA (US); Kevin Chan, Pasadena, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/660,430

(22) Filed: Feb. 25, 2010

(65) Prior Publication Data
US 2011/0204967 A1 Aug. 25, 2011

(51) Int. Cl.
*H03K 19/007* (2006.01)
(52) U.S. Cl. ................... 326/14; 326/9; 326/21
(58) Field of Classification Search ............ 326/14, 326/30, 115, 127
See application file for complete search history.

(56) References Cited

U.S. PATENT DOCUMENTS

| | | | | |
|---|---|---|---|---|
| 6,833,734 | B2 * | 12/2004 | Chan | 326/82 |
| 2002/0130767 | A1 * | 9/2002 | Fallahi et al. | 340/14.63 |
| 2005/0024088 | A1 * | 2/2005 | Lee | 326/81 |
| 2007/0139086 | A1 * | 6/2007 | Liu | 327/108 |
| 2007/0247209 | A1 * | 10/2007 | Chen | 327/333 |
| 2008/0088374 | A1 * | 4/2008 | Hou et al. | 330/254 |

* cited by examiner

*Primary Examiner* — Shawki S Ismail
*Assistant Examiner* — Jany Tran
(74) *Attorney, Agent, or Firm* — Farjami & Farjami LLP

(57) ABSTRACT

Disclosed is a false-link protection circuit comprising at least one native switch coupled between a communication terminal of a first differential switch and a communication terminal of a second differential switch. The at least one native switch is configured to provide an attenuation path for a pulse link signal received by either communication terminal when the first and second differential switches are in a powered down state. According to one embodiment, a method to attenuate a pulse link signal comprises activating a native switch of a false-link protection circuit by powering down first and second differential switches, receiving a pulse link signal at a communication terminal of one of the first and second differential switches, and attenuating the pulse link signal by diverting it through the false-link protection circuit when the first and second differential switches are in a powered down state.

20 Claims, 5 Drawing Sheets

FALSE-LINK PROTECTION CIRCUIT AND METHOD FOR UTILIZING SAME

BACKGROUND OF THE INVENTION

1. Field of the Invention

The present invention is generally in the field of electronic circuits and systems. More specifically, the present invention is in the field of communication circuits and systems.

2. Background Art

A client system that is false-linked to an electronic network may undermine the robustness of the electronic network. Under a false-link condition, a client system appears to actively communicate with the electronic network even though the client system is powered down. A false-linked client system may erroneously appear to transmit or receive data, may disrupt electronic communications and may fail interoperability specifications.

The circuit topology of a client system may contribute to a false-link condition. Even when a client system is powered down, pulse currents from the electronic network may transfer through the client system as feedthrough currents. The feedthrough currents may activate devices within the client system and make the client system appear to communicate with the electronic network. Conventional link protection mechanisms have proven insufficient to limit these feedthrough currents or prevent a false-link condition from undermining the integrity of an electronic network.

Accordingly, there is a need to overcome the drawbacks and deficiencies in the art by providing a false-link protection circuit to attenuate or suppress a pulse link signal going to a powered down client system. The false-link protection circuit should enhance interoperability of the client system with the electronic network and should be compatible with existing semiconductor manufacturing and packaging technology.

SUMMARY OF THE INVENTION

A false-link protection circuit and method for utilizing same, substantially as shown in and/or described in connection with at least one of the figures, as set forth more completely in the claims.

DETAILED DESCRIPTION OF THE INVENTION

Figure 1:
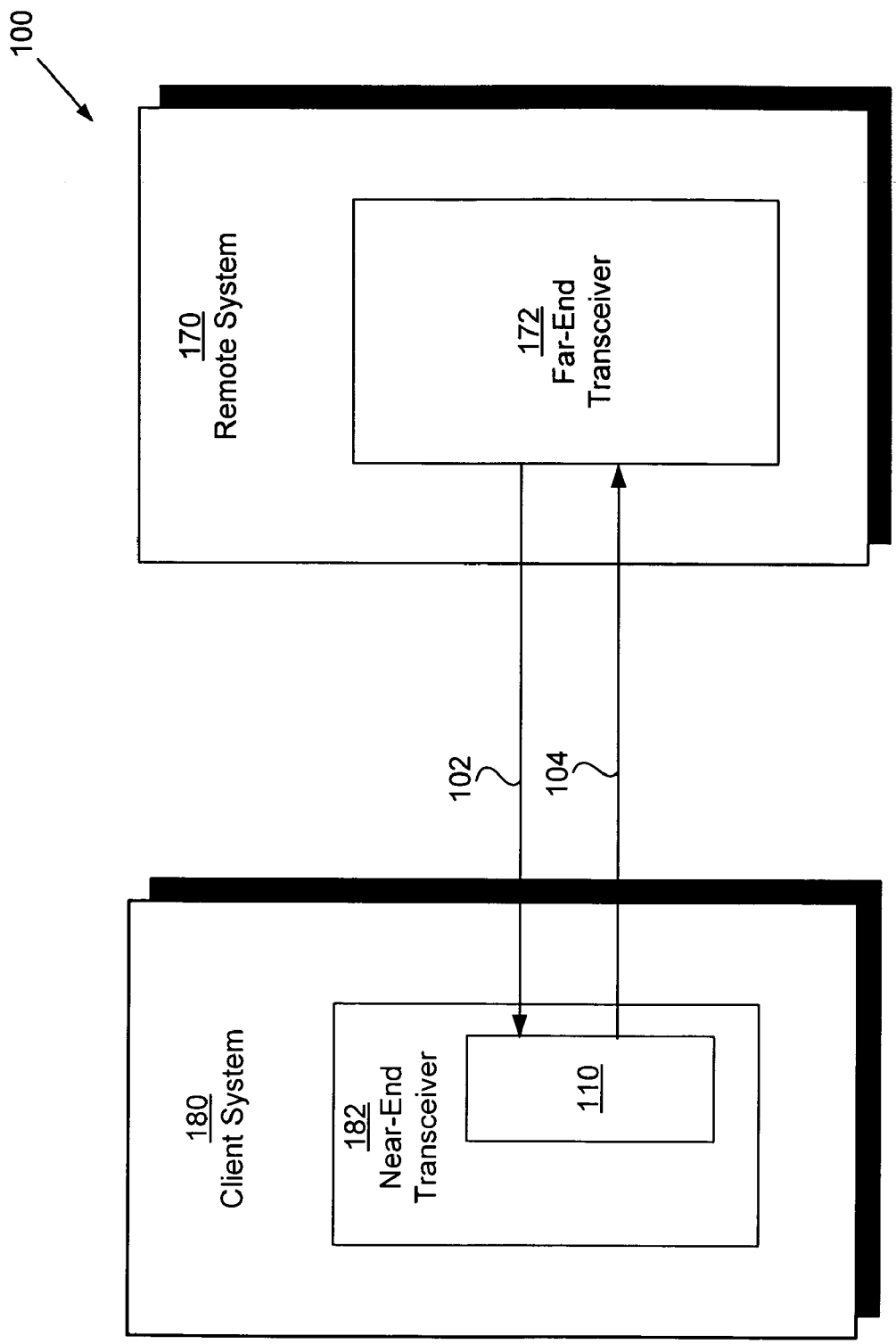
FIG. 1 shows a block diagram of an exemplary network environment suitable for implementation of one embodiment of the present invention.

The present invention is directed to a false-link protection circuit and method for utilizing same. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings. It should be borne in mind that, unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a block diagram of exemplary network environment 100. FIG. 1 provides an overview and elements shown in FIG. 1 conceptually represent physical and electrical elements. As shown, network environment 100 may contain remote system 170 and client system 180. Remote system 170 and client system 180 may reside on the same computer or printed circuit board, or on different nodes of a data, telecommunications, or other network, for example. Remote system 170 may be connected to client system 180 through a communication link, illustrated in FIG. 1 as transmission link 104 and reception link 102. Transmission link 104 and reception link 102 may each comprise single-ended lines or differential lines.

Remote system 170 may contain far-end transceiver 172, which may send or receive data from remote system 170 through transmission link 104 and reception link 102. Client system 180 may contain near-end transceiver 182 to send and receive data over the respective communication links. Near-end transceiver 182 may include an analog front-end unit (not pictured in FIG. 1) as well as analog and digital components as are known in the art. For example, near-end transceiver 182 may contain low noise amplifiers, control circuitry, signal converters, and other circuits. Near-end transceiver 182 may also contain line-driver circuit 110 to increase the quality of an entering signal before the entering signal is used by client system 180 or transmitted via transmission link 104. In conventional implementations of near-end transceiver 182, line-driver circuit 110 may appear to be linked to remote system 170, despite being in a powered down state, i.e. a problem known as false-link in the art.

Figure 2:
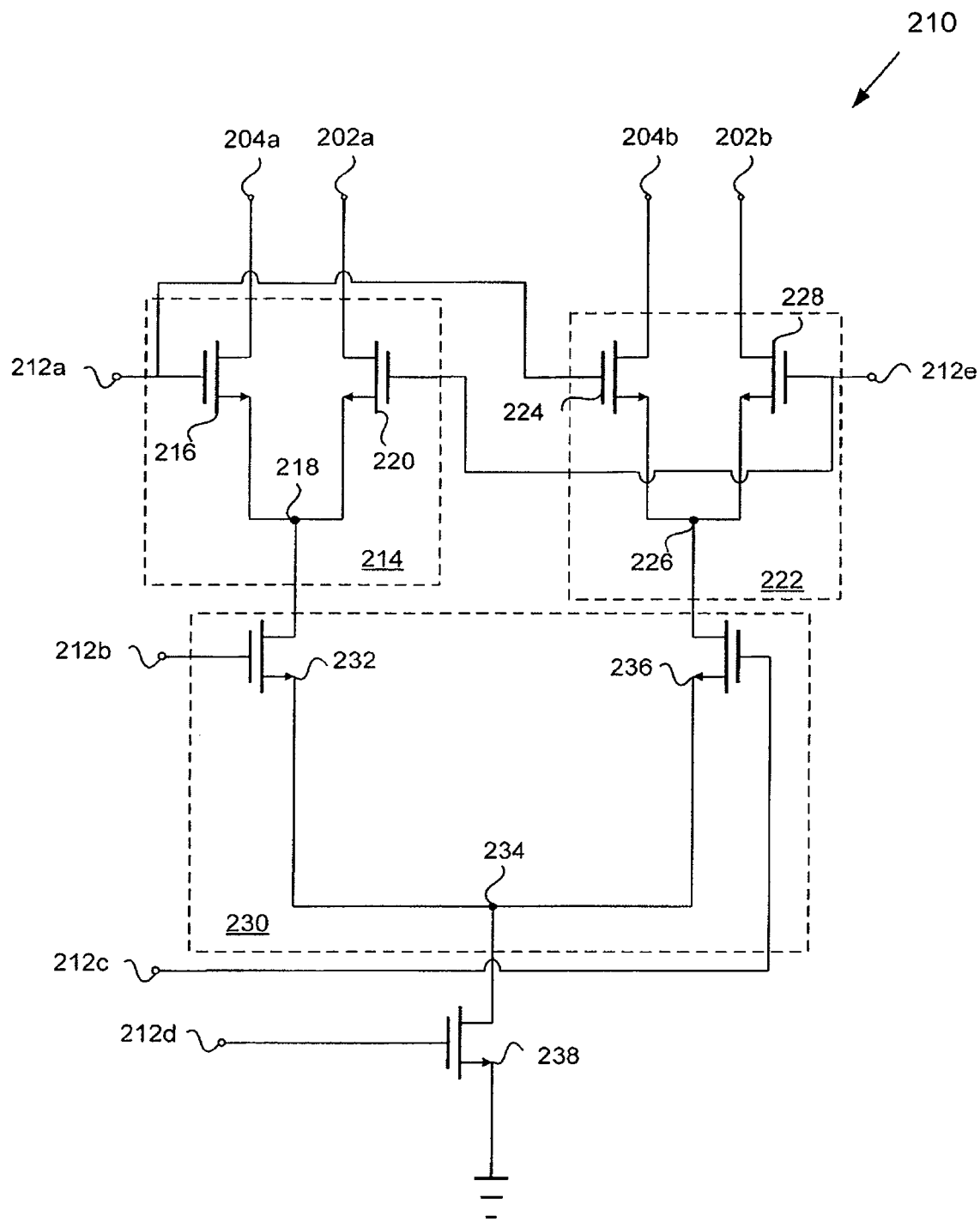
FIG. 2 shows a shows a conventional line-driver circuit.

The false-link problem is shown more fully in FIG. 2, which shows conventional line-driver circuit 210. As illustrated, conventional line-driver circuit 210 may include differential switches 214 and 222, differential pair 230 and bias transistor 238. Differential switch 214 may include metal-oxide-semiconductor field-effect transistors ("MOSFETs") 216 and 220 connected to common source node 218. Similarly, differential switch 222 may include MOSFETs 224 and 228 connected to common source node 226. Differential pair 230 may contain MOSFETs 232 and 236 connected to common source node 234. MOSFETs 216, 220, 224, 228, 232, 236 and 238 are illustrated as N type metal-oxide-semiconductor ("NMOS") transistors, but may be P type metal oxide semiconductor ("P-MOS") transistors or other types of transistors as are known in the art. Conventional line-driver circuit 210 may include control terminals 212a, 212b, 212c, 212d and 212e. Conventional line-driver circuit 210 may also comprise positive transmission terminal 204a, positive reception terminal 202a, negative transmission terminal 204b and negative reception terminal 202b.

Returning to FIG. 2, the manufacture of MOSFETs 216, 220, 224 and 228 may create parasitic bipolar junction transistors ("BJTs") that provide at least two unwanted conduction paths for current to travel through conventional line-driver circuit 210. First, each of MOSFETs 216, 220, 224 and 228 typically contains a parasitic BJT between its drain, channel and source regions, a configuration which may conduct current between a communication terminal of a differential switch and a common source of the differential switch. Secondly, the physical layout of differential switches 214 and 222 can create parasitic BJTs between the respective transmission terminal, the chip substrate and the respective reception terminal of each differential switch.

All of these parasitic BJTs may allow a pulse link signal present at communication terminals 204a, 202a, 204b or 202b to feed through conventional line-driver circuit 210 when conventional line-driver circuit 210 is powered down, e.g., is in an OFF state. More specifically, when conventional line-driver circuit 210 is powered down, a differential voltage present at communication terminals 204a, 202a, 204b or 202b is not known to correspond to transmission or reception data from conventional line-driver circuit 210. A differential voltage present at, for example, positive transmission terminal 204a and negative transmission terminal 204b may pass through the parasitic BJTs of conventional line-driver circuit 210 and transfer to positive reception terminal 202a and negative reception terminal 202b, respectively.

In the case that the differential voltage corresponds to a negative pulse link signal, the feed-through current may register at positive reception terminal 202a and negative reception terminal 202b as a signal to link conventional line-driver circuit 210 to the far-end transceiver even though conventional line-driver circuit 210 is powered OFF. A negative pulse link signal present at positive reception terminal 202a and negative reception terminal 202b may similarly register at positive transmission terminal 204a and negative transmission terminal 204b as a signal to link to the far-end transceiver even though conventional line-driver circuit 210 is powered OFF.

Under these circumstances, conventional line-driver circuit 210 would appear falsely linked to a network even though the circuit is powered OFF. A false-link condition may disrupt electronic communications within the network environment and may cause conventional line-driver circuit 210 to fail interoperability specifications that are required to integrate various components across an electronic platform.

Figure 3:
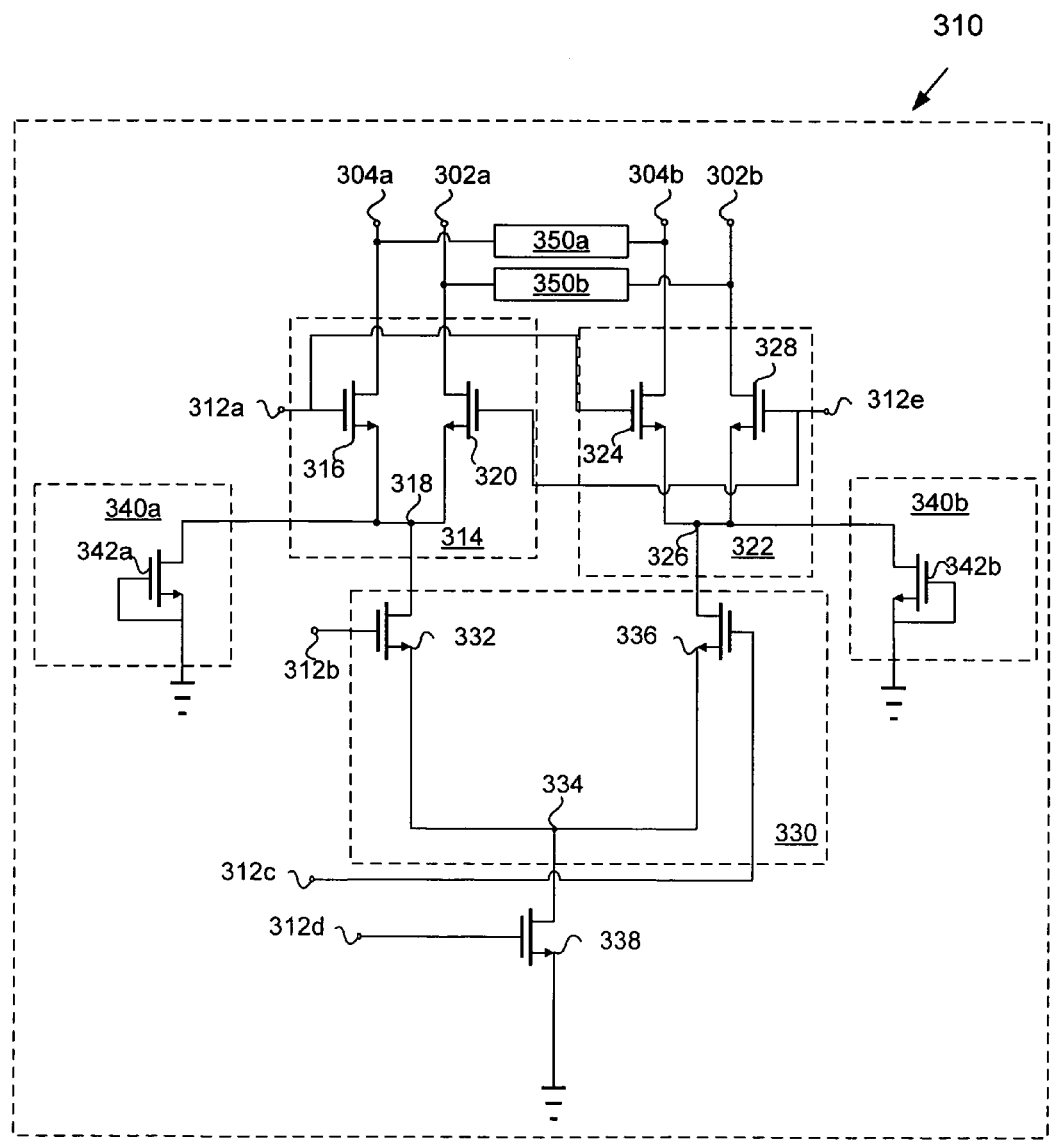
FIG. 3 shows a line-driver circuit including a false-link protection circuit, according to one embodiment of the present invention.

FIG. 3 illustrates exemplary line-driver circuit 310 according to an embodiment of the present invention. Exemplary line-driver circuit 310 may be integrated into one semiconductor die or an Ethernet physical layer ("EPHY") as is known in the art. The circuit of FIG. 3 may also be integrated into an EPHY with a cascoded differential switch configuration, as a cost reduced EPHY, for example.

As shown in FIG. 3, line-driver circuit 310 may comprise differential switch 314 with MOSFETs 316 and 320, and common source-node 318. Line-driver circuit 310 may also comprise differential switch 322 with MOSFETs 324 and 328, and common source node 326. Exemplary line-driver circuit 310 may include bias MOSFET 338, differential pair 330 (with MOSFETs 332 and 336 and common source node 334), and control terminals 312a, 312b, 312c, 312d and 312e.

As further shown in FIG. 3, line-driver circuit 310 comprises a plurality of communication terminals including positive transmission terminal 304a, positive reception terminal 302a, negative transmission terminal 304b and negative reception terminal 302b. Positive transmission terminal 304a, positive reception terminal 302a, negative transmission terminal 304b and negative reception terminal 302b may correspond to differential inputs of transmission link 104 and reception link 102 in FIG. 1. As discussed in the context of conventional line-driver circuit 210 in FIG. 2, MOSFETs 316, 320, 324 and 328 as well as differential switches 314 and 322 in FIG. 3 may be characterized by respective parasitic BJTs.

Exemplary line-driver circuit 310 may comprise first diversionary circuit 340a connected to common source 318 of differential switch 314. Line-driver circuit 310 may further comprise second diversionary circuit 340b connected to common source 326 of differential switch 322.

In an embodiment of the present invention, each of first diversionary circuit 340a and second diversionary circuit 340b may include a diversionary device connected between a respective common source node and ground. For example, first diversionary circuit 340a may include first diversionary transistor 342a with grounded gate and source nodes. Similarly, second diversionary circuit 340b may include second diversionary transistor 342b with grounded gate and source nodes. In another embodiment, diversionary circuits 340a and 340b may comprise alternative diversionary devices. For example, a diversionary reverse-biased diode clamp coupling one or both of respective common source nodes 318 and 326 could replace one or both of diversionary transistors 342a and 342b.

Line-driver circuit 310 may also include first false-link protection circuit 350a connected to positive transmission terminal 304a and negative transmission terminal 304b. Exemplary line-driver circuit 310 may further include second false-link protection circuit 350b connected to positive reception terminal 302a and negative reception terminal 302b. First false-link protection circuit 350a and second false-link protection circuit 350b may be implemented alone or in conjunction with one another.

Figure 4:
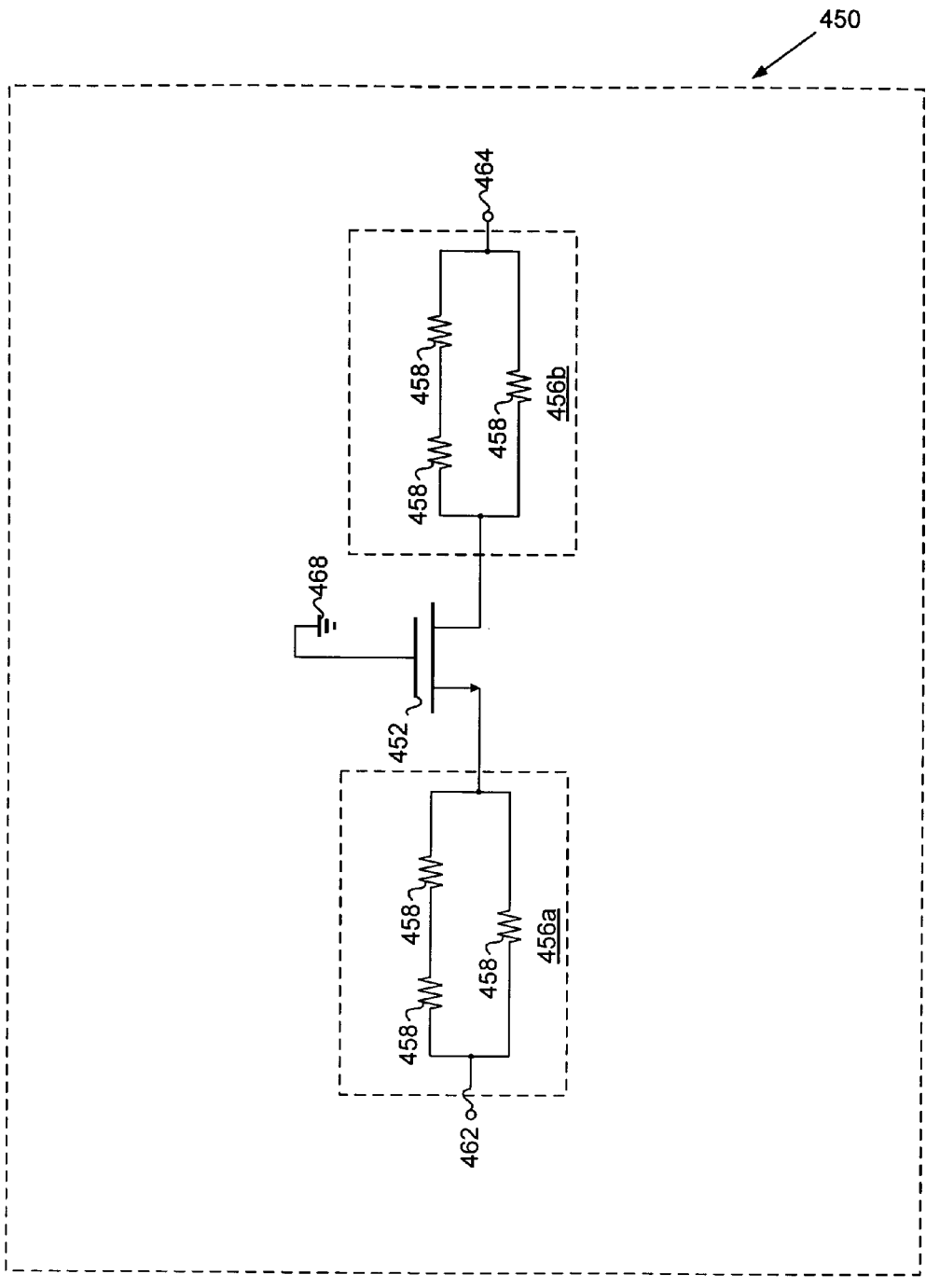
FIG. 4 shows a more detailed view of a false-link protection circuit, according to one embodiment of the present invention.

Turning to FIG. 4, FIG. 4 shows an exemplary configuration of false-link protection circuit 450, which may correspond to either first false-link protection circuit 350a or to second false-link protection circuit 350b in FIG. 3. As shown in FIG. 4, false-link protection circuit 450 comprises native switch 452, which may be a native NMOS transistor, for example. Native switch 452 may have its gate connected to ground terminal 468.

False-link protection circuit 450 may also include passive termination networks 456a and 456b. Passive termination networks 456a and 456b may each comprise termination resistors 458 and may act to protect native switch 452 and match the line impedance when the differential switches are powered up. For example, as shown in the embodiment of FIG. 4, passive termination network 456a can couple the source of native switch 452 to positive terminal 462, and passive termination network 456b can couple the drain of native switch 452 to negative terminal 464. Positive terminal 462 may correspond to positive transmission terminal 304a, in FIG. 3, when negative terminal 464 corresponds to negative transmission terminal 304b in that previous figure, for example. Alternatively, Positive terminal 462 may correspond to positive reception terminal 302a when negative terminal 464 corresponds to negative reception terminal 302b.

Figure 5:
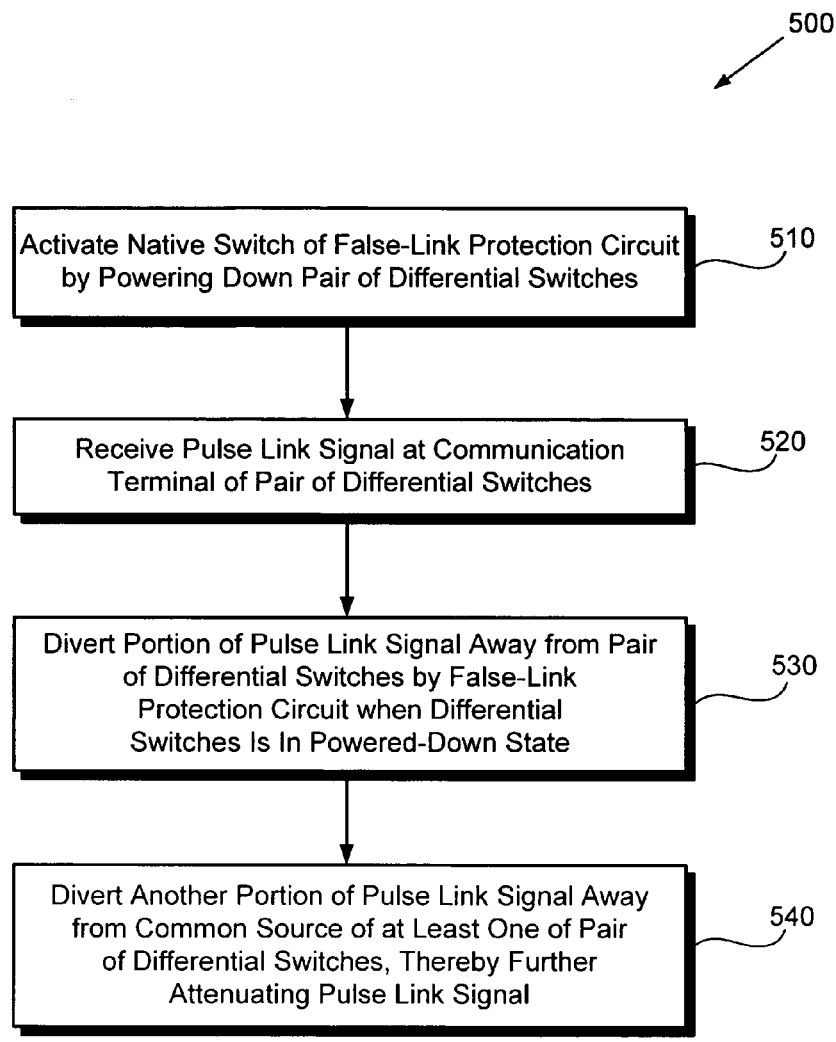
FIG. 5 is a flowchart presenting a method for attenuating a pulse link signal, according to one embodiment of the present invention.

The exemplary embodiments of diversionary circuit 340a/b shown in FIG. 3, and of false-link protection circuit 350a/b and 450 shown in FIG. 3 and FIG. 4 will be is further described by reference to flowchart 500 in FIG. 5, which describes the steps, according to one embodiment of the present invention, of a method for attenuating a pulse link signal. It is noted that certain details and features have been left out of flowchart 500 that are apparent to a person of ordinary skill in the art. For example, a step may comprise one or more substeps as known in the art. While steps 510 through 540 indicated in flowchart 500 are sufficient to describe one embodiment of the present invention, other embodiments of the invention may utilize steps different from those shown in flowchart 500.

Beginning with step 510 of flowchart 500, and referring to FIGS. 3 and 4, step 510 comprises activating a native switch of a false-link protection circuit by powering down a pair of differential switches. As shown in FIG. 3, first false-link protection circuit 350a and second false-link protection circuit 350b may be activated when differential switches 314 and 322 are powered OFF. More specifically, as shown in FIG. 4, during regular operation of the line-driver circuit the voltage at the source terminal of native switch 452 will exceed one threshold voltage value over the grounded gate voltage. In such case, native switch 452 will be in an OFF state.

However, when the line driver circuit is powered OFF, the voltage at the source terminal of native switch 452 need not exceed one threshold voltage value over the grounded gate voltage. That is, once the differential switches connected to false-link protection circuit 452 are powered OFF, the source voltage of native switch 452 may transition to a value that is less than one threshold voltage over the grounded gate voltage. Native switch 452 within false-link protection circuit 450 may therefore be activated when the pair of differential switches is powered down.

Continuing to step 520 of flowchart 500 and referring to FIGS. 3 and 4, step 520 comprises receiving a pulse link signal at a communication terminal of the pair of differential switches. As illustrated in FIG. 3, a pulse link signal may be received from a far-end transceiver by one of positive transmission terminal 304a, positive reception terminal 302a, negative transmission terminal 304b or negative reception terminal 302b. With reference to FIG. 4, the positive component of the pulse link signal may be received by positive terminal 462 of false-link protection circuit 450, and the negative component of the pulse link signal may be received by negative terminal 464 of false-link protection circuit 450.

Turning to step 530 of flowchart 500 and referring to FIGS. 3 and 4, step 530 comprises diverting a portion of the pulse link signal away from the pair of differential switches by the false-link protection circuit when the pair of differential switches is in a powered down state. As illustrated in FIG. 3, either first false-link protection circuit 350a or second false-link protection circuit 350b may divert a portion of a pulse link signal away from differential switches 314 and 322.

With reference to the structure illustrated in FIG. 4, the pulse link signal may create a potential difference across positive terminal 462 and negative terminal 464 of false-link protection circuit 450. As a result, passive termination networks 456a and 456b may bias the source and drain terminals of native switch 452 to conduct a portion of the pulse link signal and thus attenuate a portion of the pulse link signal. A portion of the pulse link signal may therefore be diverted away when the pair of differential switches is in a powered down state.

Turning to step 540 of flowchart 500 and returning to FIG. 3, step 540 comprises diverting another portion of the pulse link signal away from the common source of at least one switch of the pair of differential switches, thereby further attenuating the pulse link signal. As illustrated in FIG. 3, the portions of the pulse link signal that did not dissipate though first false-link protection circuit 350a and second false-link protection circuit 350b may still flow through a differential switch. For example, a portion of the pulse link signal may flow through first differential switch 314 or second differential switch 322. To divert either of these portions of the pulse link signal, a diversionary circuit or diversionary device may connect to a common source of a differential switch. For example, first diversionary transistor 342a may be connected to common source 318 of first differential switch 314. Similarly, second diversionary transistor 342b may be connected to common source 326 of second differential switch 322.

First diversionary transistor 342a may then conduct a portion of the pulse link signal away from common source 318 of differential switch 314 to ground. Similarly, second diversionary transistor 342b may conduct a portion of the pulse link signal away from common source 326 of differential switch 322 to ground. Accordingly, first diversionary transistor 342a and second diversionary transistor 342b may serve to further attenuate a portion of the pulse link signal.

As illustrated by the above description and the drawings described therein, the present invention discloses a novel and inventive false-link protection circuit and method for utilizing same. By integrating a false-link protection circuit into a same semiconductor die utilized for a front-end transceiver, the present invention can limit feedthrough currents and can reduce the possibility of a false-link to a far-end transceiver without undue fabrication cost or waste of semiconductor die area. The present invention may also maintain performance specifications of front-end transceivers and EPHYs. The present invention therefore presents significant advantages without adversely affecting return loss, interface specifications and system response specifications, including specifications related to rise-time response and fall-time response. The present invention is applicable to the design and development of EPHYs, including EPHYs with cascoded differential switches and cost reduced EPHYs.

From the above description of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. A false-link protection circuit comprising:
    at least one native switch coupled between a communication terminal of a first differential switch and a communication terminal of a second differential switch;
    said at least one native switch configured to provide an attenuation path for a pulse link signal received by said communication terminal of said first differential switch when said first and second differential switches are in a powered down state; and
    said at least one native switch configured to provide an attenuation path for a pulse link signal received by said communication terminal of said second differential switch when said first and second differential switches are in a powered down state.

2. The false-link protection circuit of claim 1 further comprising a diversionary device connected to a common source of at least one of said first and second differential switches, said diversionary device configured to divert a portion of said pulse link signal away from said common source.

3. The false-link protection circuit of claim 1, wherein said communication terminal of said first differential switch corresponds to one of a transmission terminal and a reception terminal of said first differential switch, and said communication terminal of said second differential switch corresponds to one of a transmission terminal and a reception terminal of said second differential switch.

4. The false-link protection circuit of claim 1, wherein said at least one native switch is coupled to each said communication terminal through a passive termination network.

5. The false-link protection circuit of claim 1, wherein said false-link protection circuit is incorporated into a near-end transceiver.

6. The false-link protection circuit of claim 1, wherein said false-link protection circuit is configured to prevent a false link to a far-end transceiver.

7. The false-link protection circuit of claim 1, wherein said false-link protection circuit is incorporated in a line-driver circuit.

8. The false-link protection circuit of claim 1, wherein said false-link protection circuit is incorporated in an analog front-end unit.

9. The false-link protection circuit of claim 1, wherein said false-link protection circuit is integrated into a semiconductor die.

10. The false-link protection circuit of claim 1, wherein said false-link protection circuit is integrated into an Ethernet physical layer ("EPHY").

11. A method to attenuate a pulse link signal, said method comprising:
   activating a native switch of a false-link protection circuit by powering down first and second differential switches;
   receiving a pulse link signal at a communication terminal of one of said first and second differential switches;
   attenuating said pulse link signal by diverting said pulse link signal away from said first and second differential switches and through said false-link protection circuit when said first and second differential switches are in a powered down state.

12. The method of claim 11, further comprising diverting a portion of said pulse link signal away from a common source of at least one of said first and second differential switches.

13. The method of claim 12, wherein diverting said portion is performed by a diversionary device coupled to said common source.

14. A false-link protection circuit configured to attenuate a pulse link signal, said false-link protection circuit comprising:
   at least one native switch coupled between a communication terminal of a first differential switch and a communication terminal of a second differential switch;
   said at least one native switch configured to provide an attenuation path for said pulse link signal when said first and second differential switches are in a powered down state;
   said false-link protection circuit configured for use with at least one reverse-biased diode clamp connected to a common source of at least one of said first and second differential switches;
   said at least one reverse-biased diode clamp configured to divert a portion of said pulse link signal away from said common source when said first and second differential switches are in a powered down state.

15. The false-link protection circuit of claim 14, wherein said at least one native switch is coupled to each said communication terminal through a respective passive termination network.

16. The false-link protection circuit of claim 14, wherein said false-link protection circuit is incorporated into a near-end transceiver.

17. The false-link protection circuit of claim 14, wherein said false-link protection circuit is configured to prevent a false link to a far-end transceiver.

18. The false-link protection circuit of claim 14, wherein said false-link protection circuit is incorporated in a line-driver circuit.

19. The false-link protection circuit of claim 14, wherein said false-link protection circuit is incorporated in an analog front-end unit.

20. The false-link protection circuit of claim 14, wherein said false-link protection circuit is integrated into an Ethernet physical layer ("EPHY").

* * * * *